US012602261B2

(12) United States Patent　　(10) Patent No.: US 12,602,261 B2

Sakthivel et al.　　(45) Date of Patent: Apr. 14, 2026

(54) CONTAINER SCHEDULING ACCORDING TO PREEMPTING A SET OF PREEMPTABLE CONTAINERS DEPLOYED IN A CLUSTER

(71) Applicant: Hewlett Packard Enterprise Development LP, Houston, TX (US)

(72) Inventors: Thavamaniraja Sakthivel, Bangalore (IN); Siva Subramaniam Manicka, Bangalore (IN); Vinnarasu Ganesan, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 826 days.

(21) Appl. No.: 17/821,543

(22) Filed: Aug. 23, 2022

(65) Prior Publication Data

US 2024/0069979 A1　Feb. 29, 2024

(51) Int. Cl.
G06F 9/50 (2006.01)

(52) U.S. Cl.
CPC .......... G06F 9/5077 (2013.01); G06F 9/5022 (2013.01); G06F 9/5072 (2013.01); *G06F 2209/505* (2013.01)

(58) Field of Classification Search
None
See application file for complete search history.

(56) References Cited

U.S. PATENT DOCUMENTS

| | | | | |
|---|---|---|---|---|
| 2018/0081722 A1* | 3/2018 | Kirchner | ............... | G06F 9/5088 |
| 2023/0259407 A1* | 8/2023 | Lang | .................... | G06F 9/5044 |
| | | | | 718/105 |
| 2023/0319645 A1* | 10/2023 | Gautam | ................. | H04L 41/40 |
| | | | | 370/329 |

OTHER PUBLICATIONS

Mohan, A., et al., "Seamless Container Migration Between Cloud and Edge", Computer Science and Engineering Senior Theses, Jun. 14, 2021, pp. 41.

(Continued)

*Primary Examiner* — Eric C Wai

(74) *Attorney, Agent, or Firm* — Slater Matsil, LLP

(57) ABSTRACT

Examples described herein relate to a scheduling assistance sub-system for deploying a container in a cluster comprising member nodes. The scheduling assistance sub-system receives a container deployment request to deploy the container and forwards it to a container scheduler after determining the resource requirements of the container. In some examples, at the time of receiving the container deployment request, the member nodes collectively host a plurality of already-deployed containers. Responsive to receiving the container deployment request, the scheduling assistance sub-system determines if the container deployment request is assigned a pending status by the container scheduler. Further, the scheduling assistance sub-system may identify a set of preemptable containers on a single member node based on the resource requirements of the container. Furthermore, the scheduling assistance sub-system may preempt the set of preemptable containers on the single member node thereby releasing resources for deployment of the container on the single member node.

20 Claims, 6 Drawing Sheets

SCHEDULING ASSISTANCE SUB-SYSTEM 500

PROCESSING RESOURCE 504

COMMUNICATION BUS 502

MACHINE-READABLE STORAGE MEDIUM 506

RESOURCE REQUIREMENT DATA 507

CLUSTER CONFIG. DATA 508

INSTRUCTIONS TO RECEIVE A CONTAINER DEPLOYMENT REQUEST ... 510

INSTRUCTIONS TO DETERMINE IF THE CONTAINER DEPLOYMENT REQUEST IS ASSIGNED A PENDING STATUS ... 512

INSTRUCTIONS TO IDENTIFY A SET OF PREEMPTABLE CONTAINERS ... 513

INSTRUCTIONS TO PREEMPT THE SET OF PREEMPTABLE CONTAINERS ... 514

INSTRUCTIONS TO DIRECT A CONTAINER SCHEDULER TO DEPLOY THE CONTAINER ... 515

NETWORK INTERFACE 516

(56)        References Cited

OTHER PUBLICATIONS

Red Hat Openshifts; "Controlling pod placement using node taints"; retrieved from: docs.openshift.com/container-platform/4.7/nodes/ scheduling/nodes-scheduler-taints-tolerations.html, retrieved on: Jun. 14, 2022; pp. 19.

Smimite, O., et al., "Containers Placement and Migration on Cloud System", arXiv:2007.08695, vol. 176, No. 35, Jul. 16, 2020, 10 pages.

VMWare; "Kubernetes Cost Optimization: How to Rebalance Fragmented Kubernetes Clusters to Reduce Cloud Costs", retrieved from: blogs.vmware.com/cloudhealth/rebalance-fragmented-kubernetes-clusters-reduce-cloud-costs/, Dec. 15, 2020; 8 pages.

\* cited by examiner

CONTAINER SCHEDULING ACCORDING TO PREEMPTING A SET OF PREEMPTABLE CONTAINERS DEPLOYED IN A CLUSTER

BACKGROUND

Containers are virtual computing resources that bundle useful elements, for example, resource allocations (e.g., compute, storage, etc.), data, instructions, etc. into a single executable unit for an application to run in any computing environment. Container management applications facilitate the creation, deployment, and/or management of containers. For example, a container orchestrator such as Kubernetes may be implemented in an IT infrastructure to enable deployment and management (e.g., migration, scaling, load balancing,) of containers and workloads (e.g., applications) running on the containers.

A container orchestrator, such as Kubernetes, manages a group of host computing nodes in the form of a cluster. The host computing nodes are computing systems that are capable of hosting and executing containers. In such a cluster, one or more host computing nodes operate as member nodes, and at least one host computing node operates as a conductor node. Typically, the conductor node hosts container management services, such as a scheduler, and the member nodes include resources (e.g., compute resources, storage resources, etc.) useful for hosting containers as they run their respective workloads. During operation, the scheduler may receive a request to deploy a container. Upon receiving the request, the scheduler determines resource availability on each member node of the cluster to determine if the container can be deployed on any of the member nodes in the cluster. Generally, member nodes are configured with a predetermined, fixed amount of resources, and the resource availability of each member node depends on the existing containers hosted on that particular member node.

BRIEF DESCRIPTION OF THE DRAWINGS

Features, aspects, and advantages of the present specification will become better understood when the following detailed description is read with reference to the accompanying drawings in which like characters represent like parts throughout the drawings.

Figure 1A:
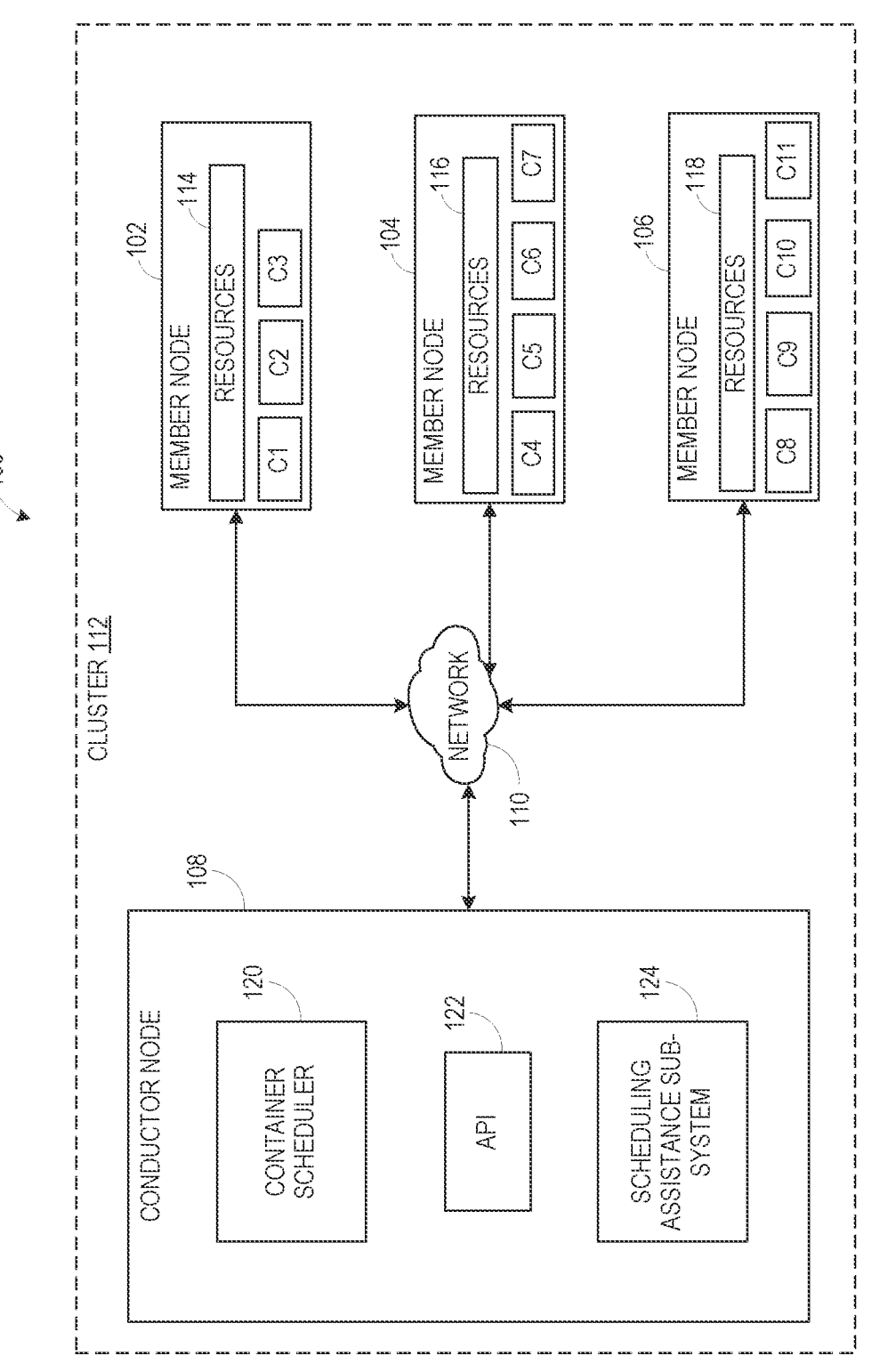
FIG. 1A depicts a system in which various of the examples presented herein may be implemented.

It is emphasized that, in the drawings, various features are not drawn to scale. In fact, in the drawings, the dimensions of the various features have been arbitrarily increased or reduced for clarity of discussion.

DETAILED DESCRIPTION

Containers have become a popular choice for implementing small-scale or large-scale cloud-native applications because of their high modularity and scalability. In fact, containers have been extensively used in today's cloud-based and distributed IT infrastructures to host applications. Containers isolate software and allow it to work independently across different operating systems, hardware, networks, and storage systems. For example, as one unit, a container can easily be moved and run on any operating system with any platform ranging from a personal computer to a large or small-scale cloud environment (e.g., public or private cloud). The container allows the container-based application to transition seamlessly through development, testing, and production environments. Because an operating system is not packed into the container, each container uses minimal computing resources, making it light and easy to install, and offers an efficient way for developers to deploy them in clusters, with individual containers holding individual components of complex applications.

A container orchestrator, for example, Kubernetes facilitates the deployment and management of containers and workloads running on the containers. When a user initiates a container deployment by defining the resource requirements for a container, a scheduler (hereinafter referred to as a container scheduler) of the container orchestrator receives a container deployment request to deploy the container. On receiving the container deployment request, the scheduler analyzes the container deployment request to determine the resource requirements of the container to be deployed and determine resource availability on each of the member nodes in the cluster. If the scheduler identifies a member node having sufficient free resources that can meet the resource requirements, the scheduler may deploy the container on the identified member node.

As it is understood, the member nodes are configured with limited resources, such as, limited computing power (e.g., a fixed number of central processing units and/or graphics processing units) and/or limited storage capacity (e.g., with limited random access memory and storage drives) at a given point in time. Accordingly, in some instances, when the number of containers hosted on any given member node of the cluster is high, the member node may run short of resources. In certain instances, the cluster may be heavily occupied with already-deployed containers and workloads such that each member node may have insufficient resources to meet the resource requirements of the container in an incoming new container deployment request. In such a scenario, the container scheduler may fail to identify any member node that can fulfill the resource requirements of the container to be deployed. Accordingly, the container scheduler cannot deploy the container in the cluster.

Typically, the container scheduler assigns a pending status to such undeployed containers and such containers with pending status join a wait queue. The container scheduler may periodically analyze the cluster for resource availability and when sufficient resources are available on any member node, the schedule may deploy any pending container according to its respective position in the wait queue.

However, in some instances, while any individual member nodes may lack sufficient resources, the cluster may collectively (e.g., considering all resources of the member nodes combined) have sufficient resources to accommodate the container to be deployed. A conventional Kubernetes container scheduler fails to account for such collective resource availability and may continue to place the new container deployment requests in the wait queue if no sufficient resources are available on a single member node. By way of example, if the resource requirements of the new container deployment request are 4 CPUs and 4 GPUs, although the cluster may have 6 CPUs and 4 GPUs available collectively with all member nodes, no member node individually has 4 CPUs and 4 GPUs free, the container scheduler may place the new container deployment request in the wait queue.

As will be understood, this results in inefficient utilization of the resources in the cluster. Further, even with having some excessive resources in the cluster, moving the new container request to a pending state may deteriorate the user experience. Moreover, the container scheduler may not provide clarity on when the new container will be deployed which in turn further degrades the user experience.

In an example consistent with this disclosure, a scheduling assistance sub-system schedules containers in an efficient manner when resources in the member nodes of the cluster are constrained. In some examples, the scheduling assistance sub-system may run in a computing node operating as a conductor node in the cluster. In particular, in some examples, the scheduling assistance sub-system may be configured to assist a container scheduler hosted on the conductor node in deploying containers in situations where the container scheduler may not identify sufficient resources on a single member node in a cluster comprising a plurality of member nodes. The plurality of member nodes may collectively host a plurality of already-deployed containers consuming at least a portion or all of the resources on the respective member nodes.

As will be appreciated, the proposed example scheduling assistance sub-system may manage the already-deployed containers on the member nodes provided the cluster has sufficient resources collectively on the member nodes to meet the resource requirements of a new container deployment request. The already-deployed containers may refer to containers that are already hosted on the member nodes in the cluster prior to the scheduling assistance sub-system receiving the container deployment request. In particular, in one example, the scheduling assistance sub-system may ensure that a container in the new container deployment request is deployed so long as the cluster has sufficient resources collectively on the member nodes, resulting in efficient utilization of the resources in the cluster. This is achieved at least in part as the scheduling assistance sub-system aids the container scheduler in deploying the container by way of intelligently creating a space for the container on any member node.

In some examples, to aid in the deployment of the container, the scheduling assistance sub-system may first determine the resource requirements of the container based on the container deployment request. Further, the scheduling assistance sub-system, responsive to receiving the request, determines if the container deployment request is assigned a pending status due to a lack of sufficient available resources in any individual member node of the plurality of member nodes to meet the resource requirements for the container. Further, in response to determining that the container is assigned the pending status, the scheduling assistance sub-system may identify a set of preemptable containers, from the plurality of already-deployed containers, on a single member node of the plurality of member nodes based on resource allocations of the plurality of already-deployed containers and the resource requirements of the container. The single member node on which the set of preemptable containers is hosted is hereinafter referred to as a target member node. If the set of preemptable containers is identified the scheduling assistance sub-system may preempt the set of preemptable containers on the target member node in response to determining that the plurality of already-deployed containers comprise a set of preemptable containers. After the preemption of the set of preemptable containers, the scheduling assistance sub-system may deploy the container on the target member node.

As the scheduling assistance sub-system may ensure that the new container will be deployed to the extent the cluster has sufficient resources, the user may also have confidence in successful container deployment. In case, the scheduling assistance sub-system fails to identify any preemptable containers, the scheduling assistance sub-system may notify the user about the failure to deploy the container immediately (e.g., within just a few minutes) as opposed to the conventional way of keeping the container in the pending state. This results in an enhanced user experience. Further, in some examples, the scheduling assistance sub-system may identify the set of preemptable containers from a sub-set of the already-deployed containers that have at least one active replica running in the cluster. In particular, unless specified, a container without an active replica may not be preempted. This may ensure that existing workloads/applications are not impacted due to such preemption.

The following detailed description refers to the accompanying drawings. It is to be expressly understood that the drawings are for the purpose of illustration and description only. While several examples are described in this document, modifications, adaptations, and other implementations are possible. Accordingly, the following detailed description does not limit disclosed examples. Instead, the proper scope of the disclosed examples may be defined by the appended claims.

Before describing examples of the disclosed systems and methods in detail, it is useful to describe an example network installation with which these systems and methods might be implemented in various applications. FIG. 1A illustrates a system 100 in which various of the examples presented herein may be implemented. The system 100 may be a networked system including a plurality of member nodes 102, 104, and 106 (hereinafter collectively referred to as member nodes 102-106); and a conductor node 108. The member nodes 102-106 may be communicatively coupled to the conductor node 108 via a network 110. In one example, the member nodes 102-106 and the conductor node 108 may form a cluster of computing nodes, hereinafter, referred to as a cluster 112 (marked with a dashed box).

The system 100 may be a distributed system where one or more of the member nodes 102-106 and the conductor node 108 are located at physically different locations (e.g., on different racks, on different enclosures, in different buildings, in different cities, in different countries, and the like) while being connected via the network 110. In certain other examples, the system 100 may be a turnkey solution or an integrated product. In some examples, the terms "turnkey solution" or "integrated product" may refer to a ready-for-use packaged solution or product where the member nodes 102-106, the conductor node 108, and the network 110 are all disposed within a common enclosure or a common rack. Moreover, in some examples, the system 100 in any form, be it the distributed system, the turnkey solution, or the integrated product, may be capable of being reconfigured by adding or removing member nodes and/or by adding or removing internal resources (e.g., compute, storage, network cards, etc.) to and from the member nodes 102-106 and the conductor node 108.

Examples of the network 110 may include, but are not limited to, an Internet Protocol (IP) or non-IP-based local area network (LAN), wireless LAN (WLAN), metropolitan area network (MAN), wide area network (WAN), a storage area network (SAN), a personal area network (PAN), a cellular communication network, a Public Switched Telephone Network (PSTN), and the Internet. In some examples, the network 110 may include one or more network switches, routers, or network gateways to facilitate data communication. Communication over the network 110 may be performed in accordance with various communication protocols such as, but not limited to, Transmission Control Protocol and Internet Protocol (TCP/IP), User Datagram Protocol (UDP), IEEE 802.11, and/or cellular communication protocols. The communication over the network 110 may be enabled via wired (e.g., copper, optical communication, etc.) or wireless (e.g., Wi-Fi®, cellular communication, satellite communication, Bluetooth, etc.) communication technologies. In some examples, the network 110 may be enabled via private communication links including, but not limited to, communication links established via Bluetooth, cellular communication, optical communication, radio frequency communication, wired (e.g., copper), and the like. In some examples, the private communication links may be direct communication links between the conductor node 108 and the member nodes 102-106.

Each of the member nodes 102-106 may be a device including a processor or microcontroller and/or any other electronic component, or a device or system that may facilitate various compute and/or data storage services. Examples of the member nodes 102-106 may include, but are not limited to, a desktop computer, a laptop, a smartphone, a server, a computer appliance, a workstation, a storage system, or a converged or hyperconverged system, and the like. In FIG. 1A, although the cluster 112 is shown to include three member nodes 102-106, the cluster 112 may include any number of member nodes, without limiting the scope of the present disclosure. The member nodes 102-106 may have similar or varying hardware and/or software configurations in a given implementation of the cluster 112. By way of example, while some member nodes may have high-performance compute capabilities, some member nodes may facilitate strong data security, some member nodes may facilitate low-latency data read and/or write operations, certain member nodes may have enhanced thermal capabilities, some member nodes may be good at handling database operations, or some member nodes may be good at handling graphics processing operations.

The member nodes 102-106 may facilitate resources, for example, compute, storage, graphics, and/or networking capabilities, for one or more c workload resources to execute thereon. In an example implementation of FIG. 1A, the workload resources are described as being containers, such as the containers C1, C2, C3, C4, C5, C6, C7, C8, C9, C10, and C11 (hereinafter collectively referred to as containers C1-C11). It is to be noted that the number of containers depicted in the cluster 112 of FIG. 1A is for illustration purposes. The number of containers that can be hosted on any member node may depend on the number of resources in the respective member nodes. Further, although not shown in FIG. 1A, in an example implementation with workload resources being containers, the member nodes 102-106 may host container management services, for example, Kubernetes member node components to facilitate a runtime environment for the containers. Example Kubernetes member node components that may be hosted on the member nodes 102-106 may include Kubelet (e.g., software agent to monitor containers), Kube-proxy (e.g., a network proxy to manage communications with containers), and a container runtime (e.g., software that is responsible for creating and running containers).

In some examples, the containers C1-C11 may be configured to execute one or more workloads (e.g., a banking application, a social media application, an online marketplace application, a website, etc.). It is to be noted that, while the containers are described as workload resources for illustration purposes in the description hereinafter, the use of other types of virtual resources, such as, but not limited to, applications (e.g., software programs), virtual machines (VMs), pods, databases, virtual data stores, logical disks, or combinations thereof is also envisioned as the workload resources. Also, the scope of the present disclosure is not construed to be limited with respect to the type, use, functionalities, and/or features offered by the workload resources and/or the workloads hosted by the workload resources.

For illustration purposes, in the example of FIG. 1A, the member node 102 is shown to host the containers C1, C2, and C3; the member node 104 is shown to the containers C4, C5, C6, and C7; and the member node 106 is shown to the containers C8, C9, C10, and C11. Although a certain number of containers are shown as being hosted by each of the member nodes 102-106 as depicted in FIG. 1A, the member nodes 102-106 may host any number of containers depending on respective hardware and/or software configurations. Further, the member nodes 102, 104, and 106 may be configured with resources 114, 116, and 118, respectively. In some examples, the resources 114, 116, and 118 may include CPUs. GPUs, storage devices, and/or network ports that may allow the containers C1-C11 to function. For the purpose of illustration, in the description hereinafter, the resources 114, 116, and 118 are described as including CPUs and GPUs. Table-1 represented below shows an example resource configuration of the member nodes 102, 104, and 106.

TABLE 1

Example resource configuration of member nodes

| Member Node | CPUs | GPUs | Already-deployed Containers | Allocated CPUs | Allocated GPUs | Free CPUs | Free GPUs |
|---|---|---|---|---|---|---|---|
| 102 | 8 | 6 | C1 | 2 | 0 | 2 | 5 |
|  |  |  | C2 | 2 | 0 |  |  |
|  |  |  | C3 | 2 | 1 |  |  |
| 104 | 10 | 5 | C4 | 1 | 1 | 5 | 2 |
|  |  |  | C5 | 1 | 1 |  |  |
|  |  |  | C6 | 1 | 1 |  |  |
|  |  |  | C7 | 2 | 0 |  |  |
| 106 | 16 | 0 | C8 | 2 | 0 | 8 | 0 |
|  |  |  | C9 | 2 | 0 |  |  |
|  |  |  | C10 | 2 | 0 |  |  |
|  |  |  | C11 | 2 | 0 |  |  |

As shown in Table 1, in an example implementation, the member nodes 102, 104, and 106 may be configured with 8, 10, and 16 CPUs respectively. Further, the member nodes 102 and 104 may also respectively have 6 and 5 GPUs. Of these resources, based on the example allocations to the existing containers C1-C11 depicted in Table 1, the member node 102 has 2 CPUs and 5 GPUs, the member node 104 has 5 CPUs and 2 GPUs, and the member node 106 has 8 CPUs as free resources. Further, the containers that are already hosted/running in the cluster 112 prior to receiving a new container deployment request are referred to as already-deployed containers. In the description hereinafter, for the purpose of illustration, the containers C1-C11 are referred to as the already-deployed containers.

In some examples, the conductor node 108 may aid in managing the already-deployed containers C1-C11 on the member nodes 102-106 and/or deployment of new containers and/or workloads on the containers C1-C11 and any new containers. In some examples, the conductor node 108 may be a device including a processor or microcontroller and/or any other electronic component, or a device or system that may facilitate various compute and/or data storage services, for example, and/or in particular, the management of the containers and workloads on the member nodes 102-106. Examples of the conductor node 108 may include, but are not limited to, a desktop computer, a laptop, a smartphone, a server, a computer appliance, a workstation, a storage system, or a converged or hyperconverged system, and the like that is configured to manage the deployment and scheduling of the containers. Further, in certain examples, the conductor node 108 may be implemented as a virtual machine or a containerized application executing on hardware in the system 100. In one example, the conductor node 108 may be implemented as a virtual machine or a containerized application on any of the member nodes 102-106 in the system 100.

In some examples, the conductor node 108 may host one or more container orchestrator services, for example, Kubernetes control plane services. In one example, the container orchestrator services may be implemented via a container scheduler 120. The container scheduler 120 may facilitate the deployment and management of containers and workloads on the containers on the member nodes 102-106. Further, an application programming interface (API) server 122 may be a component of the Kubernetes control plane that exposes the container scheduler 120 to provide access to the container scheduler 120. The API server 122 may be the front end for the Kubernetes control plane. In particular, in one example, the API server 122 may be implemented as kube-apiserver. Further, in some examples, the conductor node 108 may host a scheduling assistant sub-system 124 that may communicate with the container schedule 120 via the API server 122. The scheduling assistant sub-system 124 may be configured to assist the container scheduler 120 in deploying new containers on the member nodes 102-106 when the resources on the member nodes 102-106 are constrained. In particular, the scheduling assistant sub-system 124 may aid the container scheduler 120 in creating a space for new container deployments in situations when there are no sufficient resources available in any single member node in the cluster 112.

In one example, the scheduling assistant sub-system 124 may be configured to receive a container deployment request that a user initiates to deploy a container (hereinafter referred to as a new container). In particular, the container deployment request may define the resource requirements for the new container. Example syntax-1 presented below represents example resource requirements.

---

Syntax 1 - Example resource requirements

---

{
....
"CPU": "4"
"GPU": "4"
"environment": { }
"services": { }
...
}

---

On receiving the container deployment request, the scheduling assistant sub-system 124 may analyze the container deployment request to determine the resource requirements of the new container. As listed in the example resource requirements of the Syntax-1, along with any other requirements (not shown), the new container may require 4 CPUs and 4 GPUs. The scheduling assistant sub-system 124 may then forward the container deployment request to the container scheduler 120 via the API server 122. On receiving the request, the container scheduler 120 may determine resource availability on each of the member nodes 102-106 of the cluster 112. If the container scheduler 120 identifies a member node having sufficient free resources that can meet the resource requirements, the container scheduler 120 may deploy the new container on the identified member node.

However, for the new container (e.g., a container that requires 4 CPUs and 4 GPUs), of the present example and the heavily occupied member nodes 102-106, the container scheduler 120 may not be able to identify any single member node that has free resources to accommodate the resource requirements of the new container. In particular, in the present example (i.e., with the resource allocation as depicted in Table-1), the number of containers hosted on any given member node of the cluster 112 is high such that each member node has insufficient resources to meet the resource requirements of the container in an incoming new container deployment request. In particular, none of the member nodes 102-106 has 4 CPUs and 4 GPUs free to accommodate the new container. In such a scenario, the container scheduler 120 may fail to identify any member node that can fulfill the resource requirements of the container to be deployed. Accordingly, in one example, the container schedule 120 may assign a pending status to the container deployment request and the container deployment request may be included in a wait queue.

In accordance with an example consistent with the present disclosure, the scheduling assistance sub-system 124 may continuously monitor the wait queue and fetch entries from the wait queue. In the present example, the scheduling assistance sub-system 124 may obtain the container deployment request with the container demanding 4 CPUs and 4 GPUs from the wait queue. Further, responsive to receiving the request and identifying the container deployment request in the wait queue, the scheduling assistance sub-system 124 determines if the plurality of already-deployed containers C1-C11 includes a containers that can be preempted (hereinafter referred to as a set of preemptable containers). In some examples, scheduling assistance sub-system 124 may identify the set of preemptable containers, from the plurality of already-deployed containers, on a single member node of the plurality of member nodes based on resource allocations (e.g., see Table-1) of the plurality of already-deployed containers C1-C11 and the resource requirements (e.g., see Syntax-1) of the new container. The single member node on which the set of preemptable containers is hosted is hereinafter referred to as a target member node. Details of an example method for identifying the preemptable containers are described in conjunction with a flow diagram of FIG. 4. For instance, by executing the example method of identifying the preemptable containers, the scheduling assistance sub-system 124 may identify the container C3 as the preemptable container.

If the set of preemptable containers is identified, the scheduling assistance sub-system 124 may preempt the set of preemptable containers on the target member node. In one example, container C3 (i.e., one that is identified as preemptable) may be preempted from the member node 102 (e.g., the target member node). After the preemption of the set of preemptable containers, the scheduling assistance sub-system 124 may deploy the new container on the target member node. For the purpose of illustration, FIG. 1B represents a configuration of the cluster 112 after the deployment of the new container (marked as 'NC').

Figure 1B:
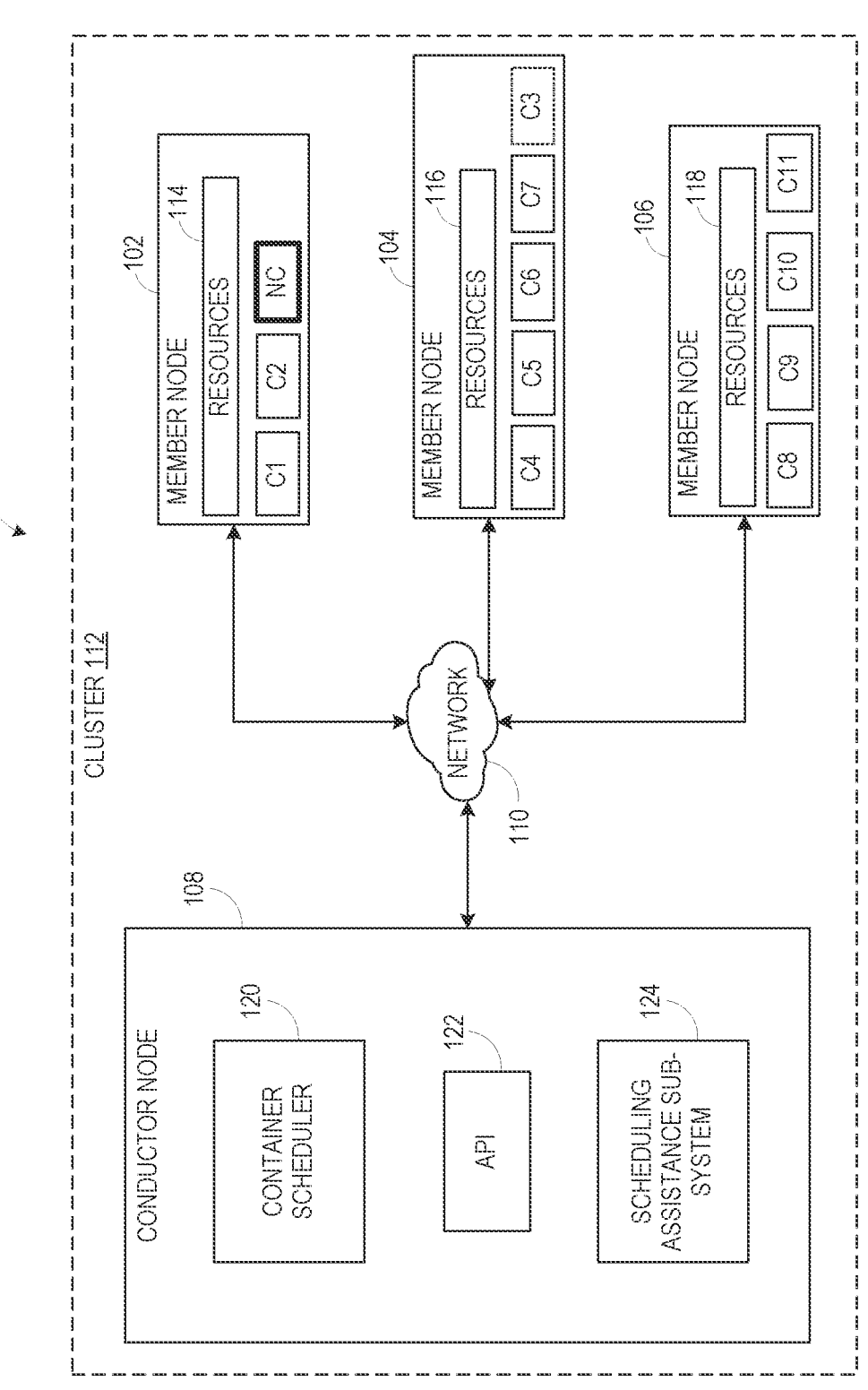
FIG. 1B depicts a configuration of a cluster in the system of FIG. 1A after the deployment of a new container.

Referring now to FIG. 1B, FIG. 1B depicts the system 100 of FIG. 1A after the deployment of a new container. In particular, FIG. 1B represents a configuration or a state of the cluster 112 after the deployment of the new container (marked as 'NC') with the resource requirements of 4 CPUs and 4 GPUs as shown in Syntax-1. Based on the resource requirements of 4 CPUs and 4 GPUs of the new container and an instantaneous resource configuration of the member nodes 102-104 (see Table-1), the scheduling assistance sub-system 124 identified the container C3 as the preemptable container and the member node 102 as the target member node (i.e. the member node hosting the preemptable container). Accordingly, container C3 has been preempted, and instead the new container "NC" (marked with a thicker outline in FIG. 1B) has been deployed on the member node 102.

Without limiting the scope of the proposed examples, the container scheduler 120 may analyze the cluster configuration again and deploy the container C3 in the cluster 112 depending on the availability of the resources on the member nodes 102-106. In the present example, the container scheduler 120 may determine that the member node 102 has sufficient resources to meet the resource requirements of container C3 (e.g., 2 CPUs and 1 GPUs). Accordingly, the container scheduler 120 may deploy container C3 on the member node 104 (e.g., marked with a dashed outline in FIG. 1B). Table-2 presented below depicts the resource configuration of the member nodes after the deployment of the new container (NC) on the member node 102 and the redeployment of the container C3 on the member node 104.

TABLE 2

Another example resource configuration of member nodes

| Member Node | CPUs | GPUs | Already-deployed Containers | Allocated CPUs | Allocated GPUs | Free CPUs | Free GPUs |
|---|---|---|---|---|---|---|---|
| 102 | 8 | 6 | C1 | 2 | 0 | 0 | 1 |
|  |  |  | C2 | 2 | 0 |  |  |
|  |  |  | NC | 4 | 4 |  |  |
| 104 | 10 | 2 | C4 | 1 | 1 | 3 | 1 |
|  |  |  | C5 | 1 | 1 |  |  |
|  |  |  | C6 | 1 | 1 |  |  |
|  |  |  | C7 | 2 | 0 |  |  |
|  |  |  | C3 | 2 | 1 |  |  |
| 106 | 16 | 0 | C8 | 2 | 0 | 8 | 0 |
|  |  |  | C9 | 2 | 0 |  |  |
|  |  |  | C10 | 2 | 0 |  |  |
|  |  |  | C11 | 2 | 0 |  |  |

As will be appreciated, the proposed example scheduling assistance sub-system 124, as described in FIGS. 1A-1B, may manage the already-deployed containers C1-C11 on the member nodes 102-106 provided the cluster 112 has sufficient resources collectively on the member nodes 102-106 to meet the resource requirements of the new container deployment request. In particular, in one example, the scheduling assistance sub-system 124 may ensure that the new container is deployed so long as the cluster 112 has sufficient resources collectively on the member nodes 102-106, by way of intelligently creating a space for the container on any member node, resulting in efficient utilization of the resources in the cluster. As the scheduling assistance sub-system 124 may ensure that the new container will be deployed to the extent the cluster has sufficient resources, the user may also have confidence in successful container deployment.

In some examples, the scheduling assistance sub-system 124 may communicate a feasibility of deployment of the new container to a user requesting deployment of the container in less than 3 minutes from receipt of the container deployment request. For example, in case, the scheduling assistance sub-system 124 fails to identify any preemptable containers, the scheduling assistance sub-system 124 may notify the user about the failure to deploy the container immediately (e.g., within just a few minutes) as opposed to the conventional way of keeping the container in the pending state. In particular, in an example highly occupied cluster having 5000 member nodes and 300000 already-deployed containers (which is maximum capacity as per Kubernetes version 1.24), the proposed example scheduling assistance sub-system 124 may merely take less than 3 minutes to determine if there are any preemptable containers in the 300000 already-deployed containers. Accordingly, for a typical cluster configuration having fewer member nodes and far lesser already-deployed containers, the proposed example scheduling assistance sub-system 124 may be much quicker in determining if there are any preemptable containers. This results in an enhanced user experience.

Further, in some examples, the scheduling assistance sub-system 124 may identify the set of preemptable containers from a sub-set of the already-deployed containers C1-C11 that have at least one active replica running in the cluster 112. In particular, unless specified, a container without an active replica may not be preempted. This may ensure that existing workloads/applications are not impacted due to such preemption.

Figure 2:
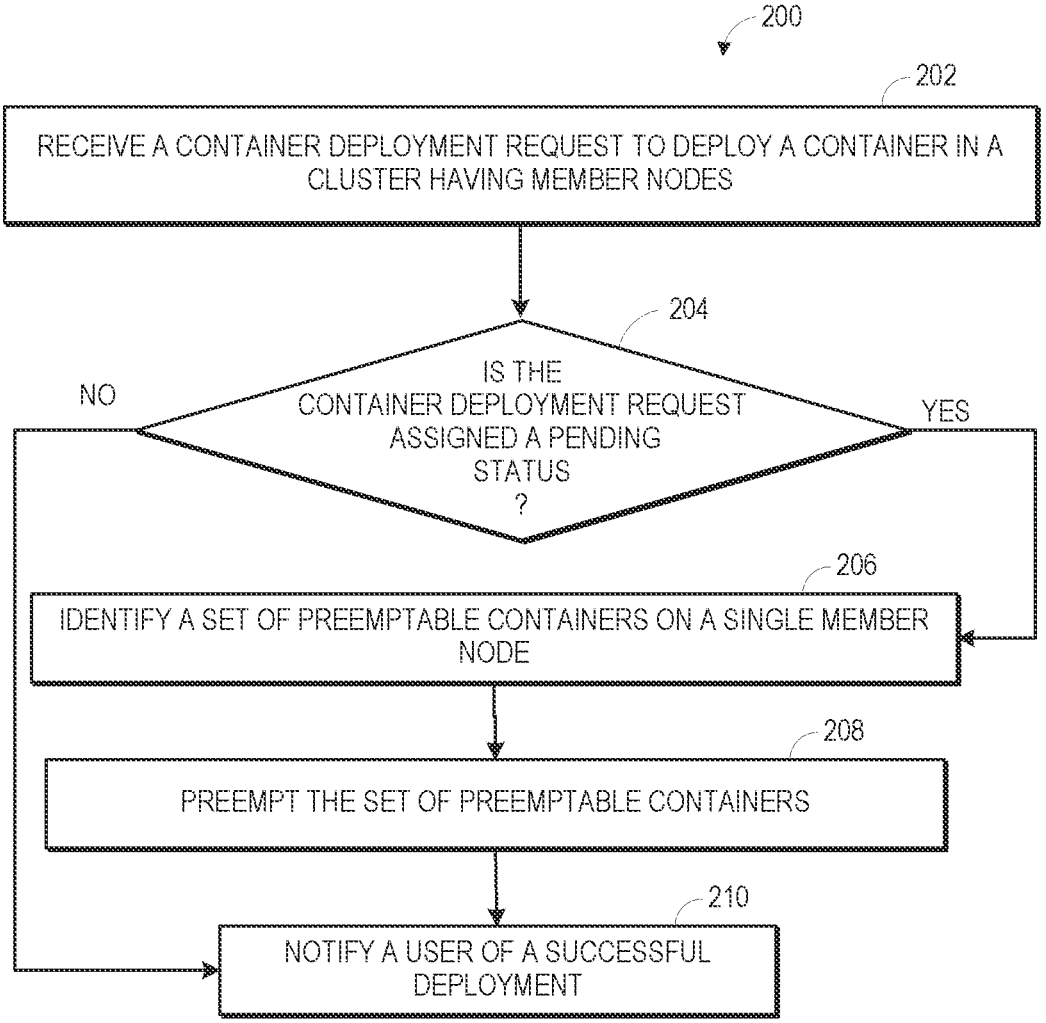
FIG. 2 depicts a flow diagram of an example method for deploying a container.

Referring now to 2, a flow diagram of an example method 200 for deploying a container is presented. The method 200 may include blocks 202, 204, 206, 208, and 210 (hereinafter collectively referred to as blocks 202-210), one or more of which may be performed by the scheduling assistance sub-system 124. In certain examples, operations at blocks 202-210 may be performed by the processing resource by executing one or more of the instructions stored in the machine-readable storage medium. Certain details of the operations performed at one or more of blocks 202-210 have already been described in conjunction with FIGS. 1A and 1B, which are not repeated herein for the sake of brevity. For ease of illustration, the method 200 of FIG. 2 is described in conjunction with FIGS. 1A and 1B. However, details and/or examples presented herein should not be construed to be limited by the specifics of FIGS. 1A and 1B.

In one example, at block 202, the scheduling assistant sub-system 124 may receive a container deployment request. The container deployment request may be initiated by a user via a container deployment and management application hosted locally on the user's computer or on a cloud platform. For example, the user may log in to his/her account on the container deployment and management service and define one or more parameters (e.g., via a graphical user interface) for a new container to be deployed and/or may select a ready-made template (e.g., container image) with preconfigured resource requirements for the new container. Once the user finalizes and submits the configuration of the container, the container deployment request may be received by the scheduling assistant sub-system 124. In particular, the container deployment request (see syntax-1, for example) may define the resource requirements for the new container. Further, the scheduling assistant sub-system 124 may analyze the container deployment request to determine the resource requirements of the new container.

Further, at block 204, the scheduling assistant sub-system 124 may perform a check to determine whether the container deployment request is assigned a pending status. As previously described in conjunction with FIG. 1A, after determining the resource requirement of the new container, the scheduling assistant sub-system 124 may forward the container deployment request to the container scheduler 120. On receiving the request, the container scheduler 120 may determine resource availability on each of the member nodes 102-106 of the cluster 112. In some examples, to aid in determining such resource availability, the container scheduler 120 may also maintain a cluster configuration database (not shown) including information about the resource configuration of the member nodes 102-106 and resources allocated to the already-deployed containers (e.g., containers C1-C11). In particular, the cluster configuration database may include information similar to the information contained in Table-1, described earlier. Further, the container scheduler 120 may update the cluster configuration database upon any change in resource allocation in the cluster 112 so that the cluster configuration database has the most recent information on the available resources in the cluster 112.

If the container scheduler 120 identifies a member node having sufficient free resources that can meet the resource requirements, the container scheduler 120 may deploy the new container on the identified member node. Once deployed, the container scheduler 120 may update the information of the container deployment request in a fulfilled request list. However, if the container scheduler 120 could not identify any single member node with sufficient resources to meet the resource requirements of the new container, the container schedule 120 may assign the pending status to the container deployment request and the container deployment request may be included in a wait queue.

In accordance with an example consistent with the present disclosure, the scheduling assistance sub-system 124 may continuously monitor the wait queue and the fulfilled request list. In particular, the scheduling assistance sub-system 124 may fetch entries from the wait queue to determine if the container deployment request received at block 202 is assigned a pending status and is present in the wait queue. In particular, if the container deployment is found in the wait queue, the scheduling assistant sub-system 124 may determine that the container deployment request is assigned the pending status. However, if the container deployment is found in the fulfilled request list, the scheduling assistant sub-system 124 may determine that the container deployment request is fulfilled.

At block 204, if it is determined that the container deployment request is not assigned the pending status (e.g., 'NO' at block 204), the scheduling assistance sub-system 124, at block 210, may notify the user of the successful deployment of the new container by sending a notification. The notification may be sent using one or more messaging techniques, including but not limited to, displaying an alert message on a display, via a text message such as a short message service (SMS), a Multimedia Messaging Service (MMS), and/or an email, via an audio alarm, video, or an audio-visual alarm, a phone call, etc. However, at block 204, if it is determined that the container deployment request is assigned the pending status (e.g., 'YES' at block 204), the scheduling assistance sub-system 124, at block 206, may identify a set of preemptable containers, from the plurality of already-deployed containers, on a single member node (also referred to as a target member node) of the plurality of member nodes based on resource allocations of the plurality of already-deployed containers (e.g., the containers C1-C11) and the resource requirements of the new container. Additional details of identifying the preemptable containers are described in conjunction with FIGS. 1A-1B and FIG. 4.

Further, at block 208, the scheduling assistant sub-system 124 may preempt the set of preemptable containers on the target member node (i.e., the member node hosting the set of preemptable containers). Additional details of preempting the containers are described in conjunction with FIG. 3. Upon preempting the preemptable containers, the target member node may have sufficient resources to host the new container. After preempting the preemptable containers, the scheduling assistant sub-system 124 may deploy the new container on the target member node. In particular, to deploy the new container, the scheduling assistant sub-system 124 may direct the container scheduler 120 by way of providing the details of the new container and the target member node. Accordingly, the new container may be deployed by the container scheduler 120 on the target member node. After preempting the preemptable containers and upon successful deployment of the new container, the scheduling assistant sub-system 124, at block 210, may notify the user of the successful deployment of the new container by sending the notification about the successful deployment.

Figure 3:
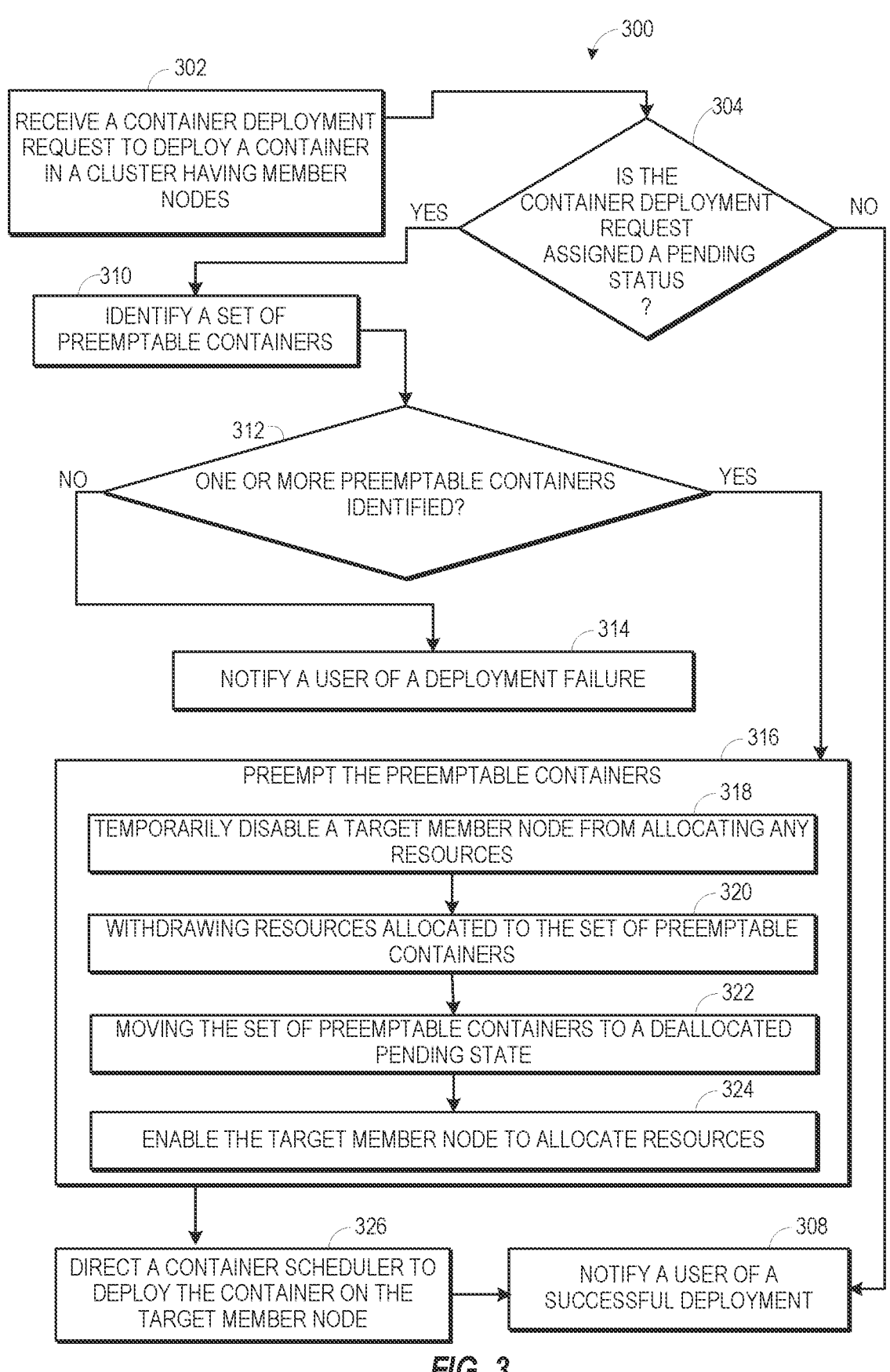
FIG. 3 depicts a flow diagram of another example method for deploying a container.

Referring now to FIG. 3, a flow diagram of an example method 300 for deploying a container is presented. The method 300 may include blocks 302, 304, 308, 310, 312, 314, 316, 318, 320, 322, 324, and 326 (hereinafter collectively referred to as blocks 302-326), one or more of which may be performed by the scheduling assistance sub-system 124. Operations at some of the blocks 302-326 may be performed via the container scheduler, such as, the container scheduler 120. In certain examples, operations at blocks 402-408 may be performed by the processing resource by executing one or more of the instructions stored in the machine-readable storage medium. The method 300 of FIG. 3 is an example representative of the method 200 of FIG. 2 and may include certain additional details and/or additional blocks than described in FIG. 2. For ease of illustration, the method 300 of FIG. 3 is described in conjunction with FIGS. 1A and 1B. However, details and/or examples presented herein should not be construed to be limited by the specifics of FIGS. 1A and 1B. Moreover, certain details of the operations performed at one or more of blocks 302-326 have already been described in conjunction with FIGS. 1A-1B and 2, which are not repeated herein for the sake of brevity.

At block 302, the scheduling assistant sub-system 124 may receive a container deployment request. The container deployment request may define the resource requirements for a new container to be deployed in a cluster, for example, the cluster 112 shown in FIGS. 1A-1B. Further, the scheduling assistant sub-system 124 may analyze the container deployment request to determine the resource requirements of the new container and then forward the container deployment request to the container scheduler 120 via the API server 122.

At block 304, the scheduling assistant sub-system 124 may perform a check to determine whether the container deployment request is assigned a pending status. Example details of performing such a check are described in conjunction with FIG. 2 and FIG. 1A-1B.

At block 304, if it is determined that the container deployment request is not assigned the pending status (e.g., 'NO' at block 304), the scheduling assistance sub-system 124, at block 308, may notify the user of the successful deployment of the new container by sending a notification, for example, in a similar manner as described in conjunction with block 210 of FIG. 2. However, at block 304, if it is determined that the container deployment request is assigned the pending status (e.g., 'YES' at block 304), the scheduling assistance sub-system 124, at block 310, may identify a set of preemptable containers, from the plurality of already-deployed containers (e.g., the containers C1-C11), on a single member node (also referred to as a target member node) of the plurality of member nodes based on resource allocations of the plurality of already-deployed containers and the resource requirements of the new container. Additional details of identifying the preemptable containers are described in conjunction with FIGS. 1A-1B and FIG. 4.

Further, at block 312, the scheduling assistant sub-system 124 may perform a check to determine if one or more preemptable containers are identified at block 310 on any one member node of the member nodes 102-106. If the scheduling assistant sub-system 124 fails in identifying any preemptable container at block 310, the scheduling assistant sub-system 124, at block 312, determines that there is no preemptable container (i.e., "NO" at block 312). However, if the scheduling assistant sub-system 124 finds one or more preemptable containers at block 310 (i.e., "YES" at block 312), the scheduling assistant sub-system 124, at block 312, determines that there are one or more preemptable containers in the plurality of the already-deployed containers C1-C11.

At block 312, if it is determined that there are no preemptable containers, the scheduling assistant sub-system 124, at block 314, may notify the user of the failure to deploy the new container by way of sending a notification (e.g., in the similar manner as described with reference to block 210 of FIG. 2). However, at block 312, if it is determined that there are one or more preemptable containers, at block 316, the scheduling assistant sub-system 124 may preempt the set of preemptable containers on a target member node (i.e., the member node hosting the set of preemptable containers).

Preempting the containers at block 316 may include performing operations at blocks 318, 320, 322, and 324, in some examples. In particular, at block 318, the scheduling assistant sub-system 124 may temporarily disable the target member node from allocating any resources. For example, at block 318, the scheduling assistant sub-system 124 may direct the container scheduler 120 to assign a taint status to the target member node. A member node with a taint status is configured not to accept any new container deployment request. Further, after the target member node is temporarily disabled from allocating resources, the scheduling assistant sub-system 124, at block 320, may withdraw resources allocated to the set of preemptable containers. Accordingly, the target member node at the end of the operation at block 320 will have additional free resources (equivalent to the resources allocated to the set of preemptable containers). In particular, upon withdrawing the resources allocated to the preemptable containers, the target member node may have sufficient resources to host the new container.

Furthermore, at block 322, the scheduling assistant sub-system 124 may move the set of preemptable containers to a deallocated pending state. Accordingly, the set of preemptable containers may join the wait queue of the container scheduler. Without limiting the scope of the proposed examples, the container scheduler 120 may analyze the cluster configuration again and deploy the set of preemptable containers in the cluster 112 depending on the availability of the resources on the member nodes 102-106. Moreover, at block 324, the scheduling assistant sub-system 124 may enable the target member node to allocate resources after the set of preemptable containers is moved to the deallocated pending state.

After enabling the target member node for resource allocation, at block 326, the scheduling assistant sub-system 124 may deploy the new container on the target member node. In particular, to deploy the new container, the scheduling assistant sub-system 124 may direct the container scheduler 120 by way of providing the details of the new container and the target member node. Accordingly, the new container may be deployed by the container scheduler 120 on the target member node. Upon successful deployment of the new container, the scheduling assistant sub-system 124, at block 308, may notify the user of the successful deployment of the new container by sending a notification (e.g., by similar means as described with respect to block 210).

Figure 4:
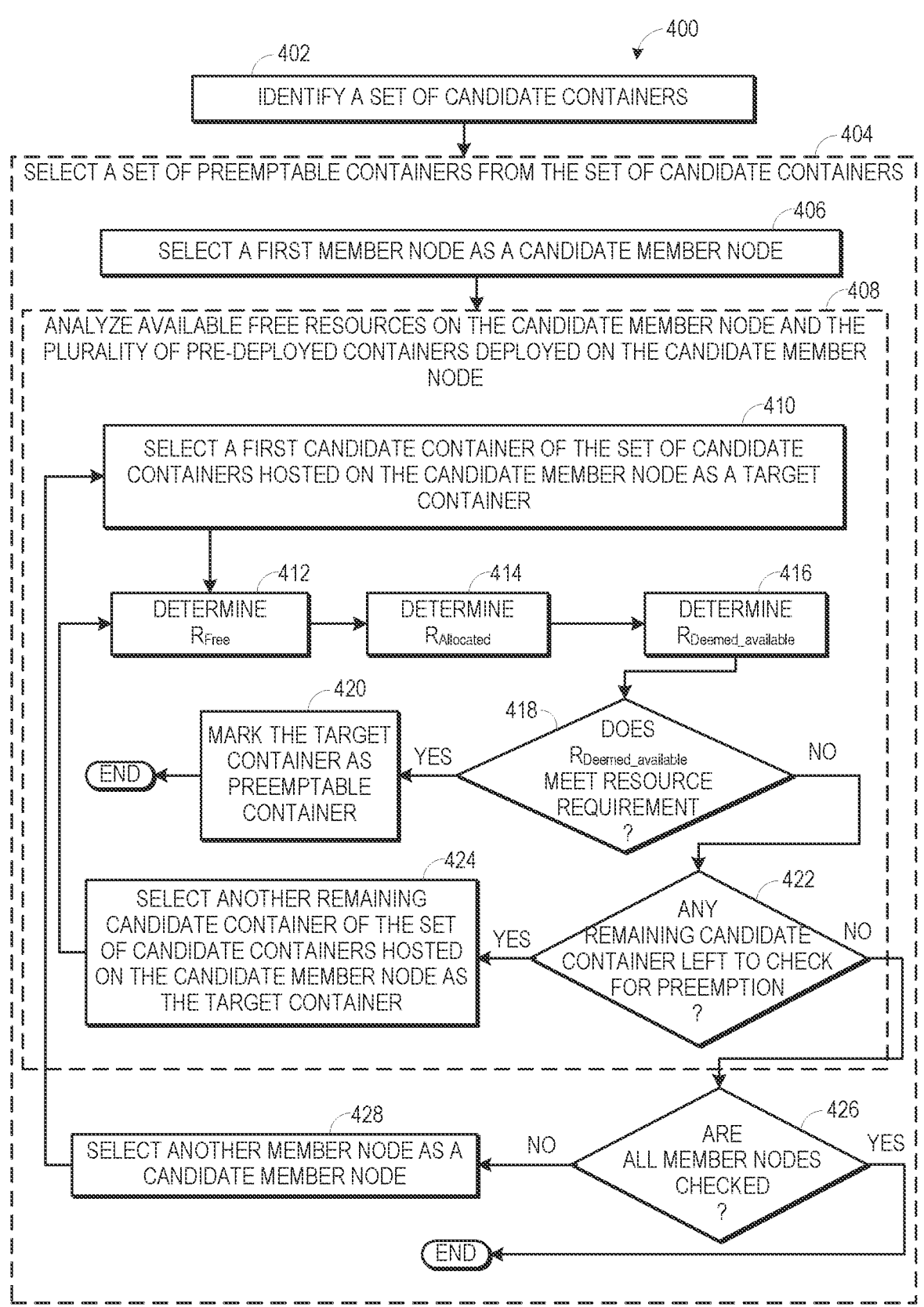
FIG. 4 depicts a flow diagram of an example method for identifying preemptable containers in a cluster.

FIG. 4 depicts an example method 400 for identifying a set of preemptable containers. In particular, the method 400 represents several operations performed at block 310 of FIG. 3. In one example, the operations at various blocks in the method 400 may be performed via a scheduling assistant sub-system, such as the scheduling assistant sub-system 124. For ease of illustration, the method 400 of FIG. 4 is described in conjunction with FIGS. 1A and 1B, however, details and/or examples presented herein should not be construed to be limited by the specifics of FIGS. 1A and 1B.

At block 402, the scheduling assistant sub-system 124 may identify a set of candidate containers from the plurality of already-deployed containers C1-C11, for example. The set of candidate containers may include containers having at least one active replica hosted in the cluster 112. In some examples, to aid in the identification of the set of candidate containers, the scheduling assistant sub-system 124 may maintain a replica map of the already-deployed containers C1-C11. The replica map includes information about the replica of the already-deployed containers C1-C11. Table-3 presented below depicts an example replica map.

TABLE 3

| Example replica map | |
|---|---|
| Already-deployed Containers | Replica |
| C1 | C4 |
| C2 | C5, C10 |
| C3 | C6, C8, |
| C4 | C1 |
| C5 | C2 |
| C6 | C3 |
| C7 | — |
| C8 | C3 |
| C9 | — |
| C10 | C2 |
| C11 | — |

As depicted in Table-3, the already-deployed containers except for C7, C9, and C11 have at least one replica in the cluster 112. Accordingly, the set of candidate containers may include the already-deployed containers C1-C6, C8, and C10 in the set of candidate containers. Once the set of candidate containers is identified, the scheduling assistant sub-system 124, at block 404, may select the set of preemptable containers from the set of candidate containers. Selecting the set of preemptable containers at block 404 may include executing operations at several sub-blocks.

In some examples, at block 406, the scheduling assistant sub-system 124 may select a first member node of the cluster 112 as a candidate member node. Further, at block 408, the scheduling assistant sub-system 124 may analyze available free resources on the candidate member node and the plurality of already-deployed containers deployed on the candidate member node. In some examples, analyzing the available free resources on the candidate member node and the plurality of already-deployed containers may include executing operations at several sub-blocks. In particular, at block 410, the scheduling assistant sub-system 124 may select a first candidate container of the set of candidate containers hosted on the candidate member node as a target container. Further, at block 412, the scheduling assistant sub-system 124 may determine the available free resources ($R_{Free}$, where R represents any type of resource, for example, CPU or GPU) on the candidate member node. The scheduling assistant sub-system 124 may refer to the resource configuration (e.g., columns "Free CPUs" and "Free GPUs" in Table-1) of the member nodes 102, 104, and 106 to determine the free resources. Furthermore, at block 414, the scheduling assistant sub-system 124 may determine allocated resources ($R_{Allocated}$) to the target container. The scheduling assistant sub-system 124 may refer to the resource configuration (e.g., columns "Allocated CPUs" and "Allocated GPUs" in Table-1) of the member nodes 102, 104, and 106 to determine the allocated resources.

Once the free and allocated resources on the candidate member node are determined with reference to the target container, at block 416, the scheduling assistant sub-system 124 may determine deemed available resources ($R_{Deemed}$_$Available$) on the candidate member node based on the available free resources and the allocated resources. The deemed available resources are resources that would be available in a situation when the resources allocated to the target container are withdrawn. In one example, the deemed available resources may be determined using equation (1).

$$R_{Deemed\_Available} = R_{Free} + R_{Allocated} \qquad (1)$$

Further, in some examples, at block 418, the scheduling assistant sub-system 124 may perform a check to determine if the deemed available resources meet the resource requirements of the new container to be deployed. At block 418, if it is determined that the deemed available resources meet the resource requirements of the new container, the scheduling assistant sub-system 124, at block 420, may mark the target container as the preemptable container and the method 400 may end.

However, at block 418, if it is determined that the deemed available resources do not meet the resource requirements of the new container, the scheduling assistant sub-system 124, at block 422, may perform another check to determine if there are any more candidate containers on the candidate member node. If it is determined that there are additional candidate containers on the candidate member node (i.e., "YES" at block 422), the scheduling assistant sub-system 124, at block 424, may select another remaining candidate container (e.g., a second candidate container) of the set of candidate containers hosted on the candidate member node as the target container and the steps of determining the available free resources (e.g., block 412), determining the allocated resources (e.g., block 414), determining the deemed available resources (e.g., block 412), and performing the check at block 414 for the second candidate container as the candidate member node. Likewise, scheduling assistant sub-system 124 may check every candidate container on the target member node until a preemptable container is identified.

However, if it is determined that there aren't any additional candidate containers on the candidate member node (i.e., "NO" at block 422) left to check for the preemption, the scheduling assistant sub-system 124 may determine that the first member node selected as the candidate member node does not have resources to meet the resource requirements of the new container. Accordingly, at block 426, the scheduling assistant sub-system 124 may perform another check to determine if all the member nodes of the cluster 112 are checked for resource availability. At block 426, if it is determined that not all the member nodes of the cluster 112 are checked (i.e., "NO" at block 426), the scheduling assistant sub-system 124, at block 428, may select another remaining member node of the cluster 112 as the candidate member node, and the control may pass to block 410. However, at block 426, if it is determined that all the member nodes of the cluster 112 are checked (i.e., "YES" at block 426), the method 400 may end. In some examples, if no single already-deployed container is identified as the preemptable container, the scheduling assistant sub-system 124 may perform the identification at block 404 for a group of candidate containers, for example, starting with a group of two candidate containers as the target container, followed by a group of three candidate containers as the target container, and so on, prior to ending the process after block 426.

Figure 5:
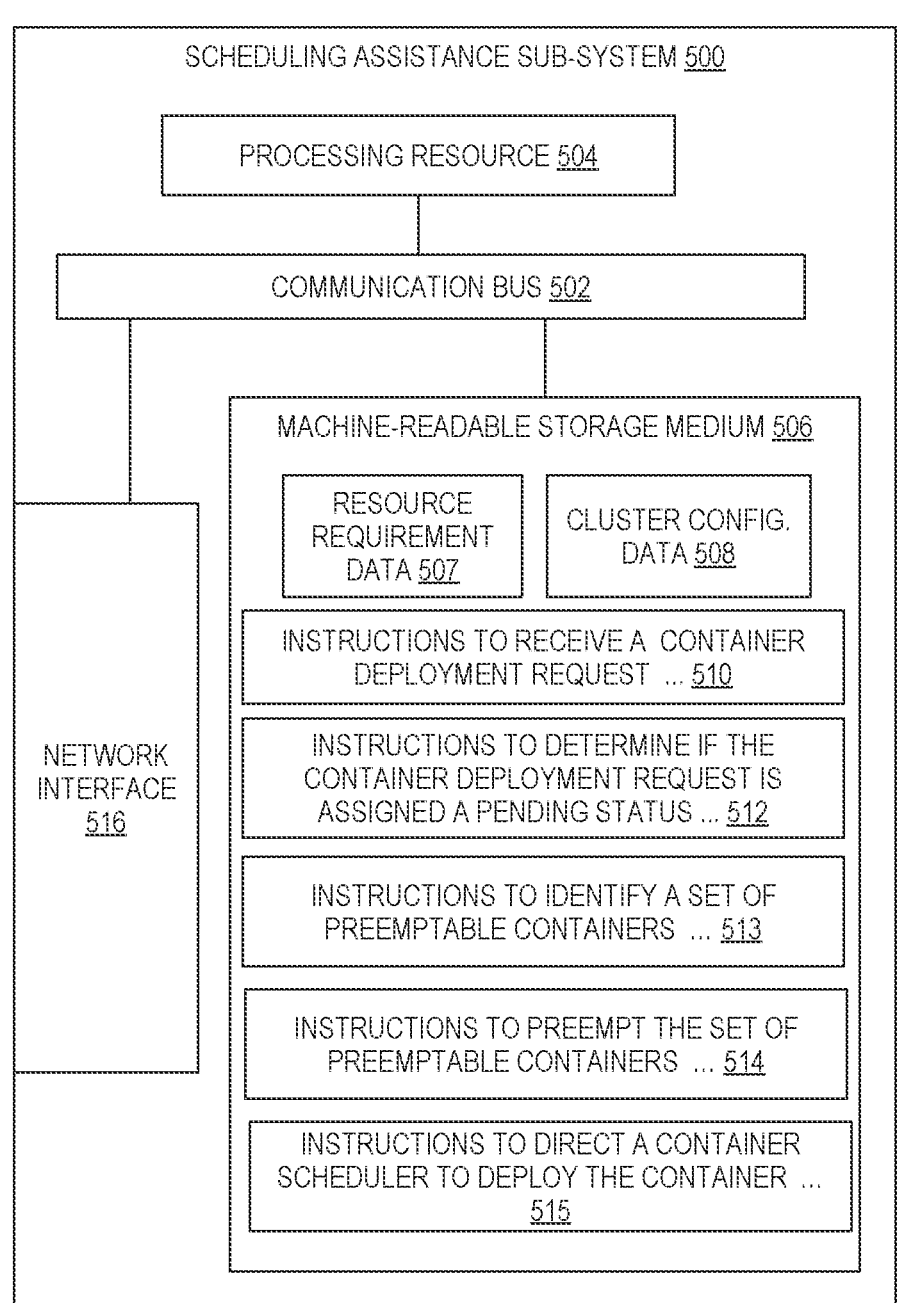
FIG. 5 depicts a block diagram of an example scheduling assistance sub-system.

FIG. 5 depicts a block diagram of an example scheduling assistance sub-system 500 in which various of the examples described herein may be implemented. In some examples, the scheduling assistance sub-system 500 may be configured to operate as the scheduling assistance sub-systems 124 when deployed in the system 100 of FIGS. 1A-1B, and can perform various operations described in one or more of the earlier drawings.

The scheduling assistance sub-system 500 may include a communication bus 502 or other communication mechanisms for communicating information (e.g., commands and/or data), a hardware processor, also referred to as processing resource 504, and a machine-readable storage medium 506 coupled to the communication bus 502 for processing information. In some examples, the machine-readable storage medium 506 may be non-transitory and is alternatively referred to as a non-transitory machine-readable storage medium 506. The machine-readable storage medium 506 may be any electronic, magnetic, optical, or any other storage device that may store data and/or executable instructions. Examples of the machine-readable storage medium 506 may include random access memory (RAM), electrically erasable programmable read-only memory (EE-PROM), a storage drive, a flash memory, magnetic disk, a compact disc read-only memory (CD-ROM), and the like.

The machine-readable storage medium 506 may store data and/or instructions. For example, the machine-readable storage medium 506 may store resource requirements data 507 and cluster configuration data 508. The resource requirements data 507 may be an example representative of the resource requirements of a new container (e.g., information representative of Syntax-1). Further, the cluster configuration data 508 may be representative of an instantaneous resource configuration of the member nodes 102-106 (e.g., information representative Table-1) described earlier. In some examples, the scheduling assistance sub-system 500 may also store the replica map (e.g., see Table-3) in the cluster configuration data 508. The instructions encoded in the machine-readable storage medium 506 may include instructions 510, 512, and 513, 514, and 515 (hereinafter collectively referred to as instructions 510-515) for performing one or more of the operations described in the method 200 of FIG. 2, for example. Although not shown, in some examples, the machine-readable storage medium 506 may be encoded with certain additional executable instructions to perform one or more other operations (e.g., operations described in FIGS. 4 and 5) performed by the scheduling assistance sub-system 124, without limiting the scope of the present disclosure.

In some examples, the processing resource 504 may include one or more central processing units (CPUs), semiconductor-based microprocessors, and/or other hardware devices suitable for retrieval and execution of instructions 510-515 stored in a machine-readable storage medium 506. The processing resource 504 may fetch, decode, and execute instructions 510-515, to manage the distribution of service discovery records to efficiently deploy a container when resources on member nodes (e.g., the member nodes 102-106) in a cluster (e.g., the cluster 112) are constrained. As an alternative or in addition to retrieving and executing instructions 510-515, the processing resource 504 may include one or more electronic circuits that include electronic components, such as, a field-programmable gate array (FPGA), an application-specific integrated circuit (ASIC), or other electronic circuits for performing the functionality of one or more instructions 510-515. In some examples, when the scheduling assistance sub-system 500 is implemented as a virtual resource (e.g., a VM, a container, or a software application), the processing resource 504 and the machine-readable storage medium 506 may respectively represent a processing resource and a machine-readable storage medium of a host system hosting the scheduling assistance sub-system 500 as the virtual resource.

Further, in some examples, the scheduling assistance sub-system 500 may also include a network interface 516 coupled to the communication bus 502. The network interface 516 provides a two-way data communication coupling to one or more network links that are connected to one or more networks (e.g., the network 110). For example, the network interface 516 may be an integrated services digital network (ISDN) card, cable modem, satellite modem, or a modem to provide a data communication connection to a corresponding type of telephone line. As another example, the network interface 516 may be a local area network (LAN) card or a wireless communication unit (e.g., Wi-Fi chip/module).

In some examples, the instructions 510-515 when executed by the processing resource 504 may cause the processing resource 504 to efficiently deploy a container when resources in the cluster (e.g., the cluster 112) are constrained. For example, the instructions 510, when executed by the processing resource 504, may cause the processing resource 504 to receive a container deployment request to deploy a container (e.g., a new container 'NC') in the cluster. The request specifies resource requirements for the container, and wherein the cluster comprises member nodes (e.g., member nodes 102-106) collectively hosting a plurality of already-deployed containers (e.g., the containers C1-C11).

Further, the instructions 512, when executed by the processing resource 504, may cause the processing resource 504 to determine, responsive to receiving the container deployment request if the container deployment request is assigned a pending status. Furthermore, the instructions 513, when executed by the processing resource 504, may cause the processing resource 504 to identify, responsive to determining that the container deployment request is assigned the pending status, a set of preemptable containers, from the plurality of already-deployed containers, on a member node of the plurality of member nodes based on resource allocations of the plurality of already-deployed containers and the resource requirements of the container.

Moreover, the instructions 514, when executed by the processing resource 504, may cause the processing resource 504 to preempt the set of preemptable containers on the target member node (i.e., a member node hosting the set of preemptable containers) in response to determining that the plurality of already-deployed containers comprise the set of preemptable containers. Additionally, the instructions 515, when executed by the processing resource 504, may cause the processing resource 504 to direct the container scheduler (e.g., the container scheduler 120) to deploy the container on the member node after preempting the set of preemptable containers.

The terminology used herein is for the purpose of describing particular examples and is not intended to be limiting. As used herein, the singular forms "a," "an," and "the" are intended to include the plural forms as well, unless the context clearly indicates otherwise. The term "another," as used herein, is defined as at least a second or more. The term "coupled," as used herein, is defined as connected, whether directly without any intervening elements or indirectly with at least one intervening element, unless indicated otherwise. For example, two elements can be coupled mechanically, electrically, or communicatively linked through a communication channel, pathway, network, or system. Further, the term "and/or" as used herein refers to and encompasses any and all possible combinations of the associated listed items. It will also be understood that, although the terms first, second, third, etc. may be used herein to describe various elements, these elements should not be limited by these terms, as these terms are only used to distinguish one element from another unless stated otherwise or the context indicates otherwise. The term "based on" means based at least in part on.

While certain implementations have been shown and described above, various changes in form and details may be made. For example, some features and/or functions that have been described in relation to one implementation and/or process can be related to other implementations. In other words, processes, features, components, and/or properties described in relation to one implementation can be useful in other implementations. Furthermore, it should be appreciated that the systems and methods described herein can include various combinations and/or sub-combinations of the components and/or features of the different implementations described.

In the foregoing description, numerous details are set forth to provide an understanding of the subject matter disclosed herein. However, an implementation may be practiced without some or all of these details. Other implementations may include modifications, combinations, and variations from the details discussed above. It is intended that the following claims cover such modifications and variations.

What is claimed is:

1. A method, comprising:
   receiving a container deployment request to deploy a container in a cluster, wherein the container deployment request specifies resource requirements for the container, and wherein the cluster comprises a plurality of member nodes collectively hosting a plurality of already-deployed containers;
   responsive to receiving the container deployment request, determining that the container deployment request is assigned a pending status due to a lack of sufficient available resources in any individual member node of the plurality of member nodes to meet the resource requirements for the container;

responsive to determining that the container deployment request is assigned the pending status, identifying a set of preemptable containers, from the plurality of already-deployed containers, on a member node of the plurality of member nodes based on resource allocations of the plurality of already-deployed containers and the resource requirements of the container; and preempting the set of preemptable containers on the member node.

2. The method of claim 1, wherein identifying the set of preemptable containers comprises:

identifying a set of candidate containers from the plurality of already-deployed containers, wherein the set of candidate containers comprises containers having at least one active replica hosted in the cluster; and selecting the set of preemptable containers from the set of candidate containers.

3. The method of claim 2, wherein selecting the set of preemptable containers comprises selecting a first member node of the cluster as a candidate member node.

4. The method of claim 3, wherein selecting the set of preemptable containers further comprises analyzing available free resources on the candidate member node and the plurality of already-deployed containers deployed on the candidate member node.

5. The method of claim 4, wherein the analyzing comprises:

selecting a first candidate container of the set of candidate containers hosted the candidate member node as a target container;

determining the available free resources on the candidate member node;

determining allocated resources to the target container; and determining deemed available resources on the candidate member node based on the available free resources and the allocated resources.

6. The method of claim 5, wherein selecting the set of preemptable containers further comprises selecting the target container as a preemptable container in response to determining that the deemed available resources meet the resource requirements of the container to be deployed.

7. The method of claim 5, wherein the analyzing further comprises:

selecting a second candidate container of the set of candidate containers hosted the candidate member node as the target container in response to determining that the deemed available resources do not meet the resource requirements of the container to be deployed; and repeating steps of determining the available free resources, determining the allocated resources, and determining the deemed available resources for the second candidate container as the candidate member node.

8. The method of claim 7, further comprising:

determining that the first member node selected as the candidate member node does not have resources to meet the resource requirements of the container;

selecting a second member node of the cluster as the candidate member node responsive to determining that the first member node does not have available resources to meet the resource requirements of the container; and repeating steps of analyzing the free available resources and the plurality of already-deployed containers for the second member node selected as the candidate member node.

9. The method of claim 1, further comprising:

temporarily disabling the member node from allocating any resources;

withdrawing resources allocated to the set of preemptable containers; and moving the set of preemptable containers to a deallocated pending state.

10. The method of claim 9, further comprising enabling the member node to allocate resources after the set of preemptable containers is moved to the deallocated pending state, wherein the container is deployed on the member node after the enabling.

11. The method of claim 1, further comprising instructing a container scheduler to deploy the container on the member node.

12. The method of claim 1, further comprising communicating a feasibility of deployment of the container to a user requesting deployment of the container in less than 3 minutes from receipt of the container deployment request.

13. A container management system, comprising:

a machine-readable storage medium storing executable instructions; and a processing resource coupled to the machine-readable storage medium, wherein the processing resource is configured to execute one or more of the instructions to:

implement a container scheduler to manage container deployment in a cluster comprising a plurality of member nodes, wherein the plurality of member nodes collectively host a plurality of already-deployed containers; and implement a scheduling assistance sub-system in communication with the container scheduler, wherein the scheduling assistance sub-system is configured to:

receive a container deployment request to deploy a container in the cluster, wherein the container deployment request specifies resource requirements for the container;

responsive to receiving the container deployment request, determine that the container deployment request is assigned a pending status by the container scheduler due to a lack of sufficient available resources in any individual member node of the plurality of member nodes to meet the resource requirements for the container;

responsive to determining that the container deployment request is assigned the pending status, identify a set of preemptable containers, from the plurality of already-deployed containers, on a member node of the plurality of member nodes based on resource allocations of the plurality of already-deployed containers and the resource requirements of the container;

preempt the set of preemptable containers on the member node; and direct the container scheduler to deploy the container on the member node.

14. The container management system of claim 13, wherein the container scheduler is configured to:

determine, responsive to receiving the container deployment request, whether each of the plurality of member nodes individually lacks resources to meet the resource requirements of the container; and assign the pending status to the container deployment request in response to determining that each of the plurality of member nodes individually lacks resources to meet the resource requirements of the container.

15. The container management system of claim 13, wherein, responsive to determining if the plurality of already-deployed containers comprises a set of preemptable containers, the scheduling assistance sub-system is configured to communicate a feasibility of deployment of the container to a user requesting deployment of the container in less than 3 minutes from receipt of the container deployment request.

16. The container management system of claim 13, wherein the container scheduler is a Kubernetes scheduler service.

17. The container management system of claim 13, wherein the scheduling assistance sub-system is configured to communicate with the container scheduler using an application programming interface.

18. A scheduling assistance sub-system, comprising:

a machine-readable storage medium storing executable instructions; and a processing resource coupled to the machine-readable storage medium, wherein the processing resource is configured to execute one or more of the instructions to:

receive a container deployment request to deploy a container in a cluster, wherein the container deployment request specifies resource requirements for the container, and wherein the cluster comprises a plurality of member nodes collectively hosting a plurality of already-deployed containers;

responsive to receiving the container deployment request, determine that the container deployment request is assigned a pending status due to a lack of sufficient available resources in any individual member node of the plurality of member nodes to meet the resource requirements for the container;

responsive to determining that the container deployment request is assigned the pending status, identify a set of preemptable containers, from the plurality of already-deployed containers, on a member node of the plurality of member nodes based on resource allocations of the plurality of already-deployed containers and the resource requirements of the container;

preempt the set of preemptable containers on the member node; and direct a container scheduler to deploy the container on the member node.

19. The scheduling assistance sub-system of claim 18, wherein the processing resource is configured to execute one or more of the instructions to:

identify a set of candidate containers from the plurality of already-deployed containers, wherein the set of candidate containers comprises containers having at least one active replica hosted in the cluster; and select the set of preemptable containers from the set of candidate containers.

20. The scheduling assistance sub-system of claim 18, wherein the processing resource is configured to execute one or more of the instructions to communicate a feasibility of deployment of the container to a user requesting deployment of the container in less than 3 minutes from receipt of the container deployment request.

* * * * *